US012636881B2

(12) United States Patent
Kim et al.

(10) Patent No.: US 12,636,881 B2
(45) Date of Patent: May 26, 2026

(54) INK DROP MEASUREMENT PAD, INKJET PRINTER DEVICE INCLUDING SAME, AND INK DROP MEASUREMENT METHOD

(71) Applicant: UNIJET CO., LTD., Gyeonggi-do (KR)

(72) Inventors: Seog Soon Kim, Gyeonggi-do (KR); Sung Jin Lee, Seoul (KR)

(73) Assignee: UNIJET CO., LTD., Gyeonggi-do (KR)

( * ) Notice: Subject to any disclaimer, the term of this patent is extended or adjusted under 35 U.S.C. 154(b) by 221 days.

(21) Appl. No.: 18/267,187

(22) PCT Filed: Sep. 2, 2021

(86) PCT No.: PCT/KR2021/011846
§ 371 (c)(1),
(2) Date: Jun. 14, 2023

(87) PCT Pub. No.: WO2022/145621
PCT Pub. Date: Jul. 7, 2022

(65) Prior Publication Data

US 2024/0042754 A1 Feb. 8, 2024

(30) Foreign Application Priority Data

Dec. 31, 2020 (KR) ........................ 10-2020-0188878

(51) Int. Cl.
*B41J 2/04* (2006.01)
*B41J 2/045* (2006.01)
*B41J 11/00* (2006.01)

(52) U.S. Cl.
CPC ......... *B41J 2/0456* (2013.01); *B41J 2/04535* (2013.01); *B41J 2/04571* (2013.01); *B41J 11/00214* (2021.01)

(58) Field of Classification Search
CPC ...... B41J 29/393; B41J 2/0451; B41J 2/0456; B41J 2/04558; B41J 2/16579; B41J 2/2142
See application file for complete search history.

(56) References Cited

FOREIGN PATENT DOCUMENTS

| | | | | |
|---|---|---|---|---|
| CN | 110077112 | A | | 8/2019 |
| JP | 2001-096776 | A | | 4/2001 |
| JP | 2004-177243 | A | | 6/2004 |
| JP | 2007125514 | A | * | 5/2007 |
| JP | 2009-078231 | A | | 4/2009 |

(Continued)

OTHER PUBLICATIONS

Miura, Machine TranslationofJP-2007125514-A, 2007 (Year: 2007).*

(Continued)

*Primary Examiner* — Scott A Richmond
(74) *Attorney, Agent, or Firm* — The PL Law Group, PLLC

(57) ABSTRACT

An ink drop measurement pad is for measuring volumes and positions of inkjet drops that are sprayed and dropped in a constant volume from nozzles of a head of an inkjet device. The ink drop measurement pad includes a pattern part including a plurality of groove portions arranged at pitch intervals corresponding to those of a plurality of head nozzles and wall portions formed between the groove portions. The groove portions are uniformly formed so as to have the same cross-section throughout an entire longitudinal direction thereof.

4 Claims, 8 Drawing Sheets

(56) References Cited

FOREIGN PATENT DOCUMENTS

| | | | |
|---|---|---|---|
| JP | 2014-140810 | A | 8/2014 |
| KR | 10-0997451 | B1 | 12/2010 |
| KR | 10-2012-0051182 | A | 5/2012 |
| WO | WO 2010/005011 | A1 | 1/2010 |

OTHER PUBLICATIONS

International Search Report for PCT/KR2021/011846 mailed on Dec. 21, 2021.

Office action issued on Jun. 22, 2022 from Korean Patent Office in a counterpart Korean Patent Application No. 10-2020-0188878 (English translation is also submitted herewith.).

European Search Report For EP21915419.2 issued on Oct. 10, 2024 from European patent office in a counterpart European patent application.

Office action issued on Mar. 27, 2026 from China Patent Office in a counterpart China Patent Application No. 202180088504.1 (all the cited references are listed in this IDS.) (English translation is also submitted herewith.).

* cited by examiner

INK DROP MEASUREMENT PAD, INKJET PRINTER DEVICE INCLUDING SAME, AND INK DROP MEASUREMENT METHOD

CROSS REFERENCE TO RELATED APPLICATIONS AND CLAIM OF

Priority

This application claims benefit under 35 U.S.C. 119, 120, 121, or 365(c), and is a National Stage entry from International Application No. PCT/KR2021/011846, filed Sep. 2, 2021, which claims priority to the benefit of Korean Patent Application No. 10-2020-0188878 filed in the Korean Intellectual Property Office on Dec. 31, 2020, the entire contents of which are incorporated herein by reference.

BACKGROUND

1. Technical Field

The present invention relates to measurement of an ink drop, and more particularly, to a measurement pad capable of easily measuring a volume and a position of an ink drop, a measurement method using same, and an inkjet printer device.

2. Background Art

When an inkjet printing technology is applied, especially when ink is applied to a pixel requiring an exact amount of ink uniformly within 1%, a deviation of volumes of ink drops ejected from each nozzle may need to be accurately measured and compensated. Also, a deviation of volumes of ink drops existing on each head may need to be compensated.

However, a deviation in processing and assembly of the head inevitably occurs in a device manufacturing process, and a deviation in ink drop applied positions of each nozzle also occurs depending on ejection conditions.

The above-described deviation in ink drop positions causes a problem of quality degradation or defects in pixel printing.

In order to solve the above-described problem, provided is a technology using the strobe technology, in which a digital camera, optical device, and LED lighting device are installed on both side surfaces of an inkjet head on a linear line in accordance with a height of the head, and an ink drop ejection time and flickering of the LED lighting device are synchronized to produce an image that seems to show one ink drop as if ink drops ejected onto a screen are stopped at one position during flight.

However, this method has a biggest problem in that an ink drop of a still image seen at a high ejection frequency is not an image of one ink drop, but an image of a plurality of overlapped ink drops with position errors and size errors according to the ejection frequency.

Thus, this method inevitably has a large measurement error due to a shape of the ink drop, straightness of the ink drop, a strobe error, an error of a plurality of substantial ink drops, a difference in lighting, and a recognition method and error (limited resolution) of a vision recognition technology.

Also, this method has a problem in that a position accuracy of ink drops ejected in front or rear directions of the camera may not be measured, a position accuracy of ink drops ejected in left and right directions is difficult to be measured, and additional time is required.

SUMMARY

The present invention provides a method for quickly and accurately processing a volume and a position of an ink drop in order to solve the above problem.

In order to solve the above-described technical problem, an embodiment of the present invention provides an ink drop measurement pad for measuring volumes and positions of inkjet drops that are sprayed and dropped in a constant volume from nozzles of a head of an inkjet device, the ink drop measurement pad including a pattern part including a plurality of groove portions arranged at pitch intervals corresponding to those of a plurality of head nozzles and wall portions formed between the groove portions, and the groove portions are uniformly formed so as to have the same cross-section throughout an entire longitudinal direction thereof.

In the ink drop measurement pad of the present invention, the pattern part may be formed in the same direction as a printing direction or a direction perpendicular to the printing direction.

In the ink drop measurement pad of the present invention, the pattern part may be formed such that the pattern part formed in the same direction as the printing direction and the pattern part formed in the direction perpendicular to the printing direction are simultaneously formed in one pad.

In the ink drop measurement pad of the present invention, the groove portion may be made of a lyophilic material, an upper wall portion of the wall portion may be made of a lyophobic material, and a side wall portion of the wall portion may be made of the lyophilic or lyophobic material.

In the ink drop measurement pad of the present invention, wherein the groove portion may be coated with a lyophilic material, an upper wall portion of the wall portion may be coated with a lyophobic material, and a side wall portion of the wall portion may be coated with the lyophilic or lyophobic material.

In the ink drop measurement pad of the present invention, a width, and a depth of the groove portion in the pattern part may be formed to realize: an ink property related to ink spreading characteristics such as viscosity, surface tension, drying characteristics, and polarity of ink; and sufficient ink drop spreading required for a measurement precision depending on a cross-sectional shape of the groove portion and a surface state such as surface tension and roughness of a bottom surface of the groove portion.

In the ink drop measurement pad of the present invention, the pad may have a flat sheet shape.

In the ink drop measurement pad of the present invention, the pad may have a roll shape so that the pad is continuously supplied with a width corresponding to that of the inkjet head and a predetermined length and removed from the inkjet device.

In the ink drop measurement pad of the present invention, the pad may have a transparent color different from a color of the ink.

In the ink drop measurement pad of the present invention, the groove portion and the wall portion may have different colors from each other.

In an embodiment of the present invention, an inkjet device including the ink drop measurement pad includes: an inkjet printer unit; and a head maintenance unit installed in parallel to the inkjet printer unit, the inkjet printer unit includes: a Y1 stage on which an object b1 to be printed is disposed and which is movable in a Y-direction; and a X1 stage installed higher than a height of the object b1 to be printed and extending to be movable until a Y2 stage of the head maintenance unit in an X-direction, and the head maintenance unit includes: a Y2 stage installed in parallel to the Y1 stage and movable in the Y-direction; a plate device installed on the Y2 stage to fix the ink drop measurement pad; and an ink drop measurement device installed on the head maintenance unit to measure a length and a position of each ink drop dropped onto the pad.

In the inkjet device including the ink drop measurement pad of the present invention, an X2 stage may be additionally installed on the head maintenance unit to be movable in the X-direction, and an ink removal device configured to remove the ink drop dropped onto the pad may be installed on the X2 stage.

In the inkjet device including the ink drop measurement pad of the present invention, a roll supply device configured to continuously supply the ink drop measurement pad to the plate device in a roll manner may be additionally installed on the head maintenance unit.

In the inkjet device including the ink drop measurement pad of the present invention, the ink removal device may include a vacuum suction device configured to suction the ink drops.

In the inkjet device including the ink drop measurement pad of the present invention, the ink removal device may include an UV irradiation device configured to cure the ink drops.

In an embodiment of the present invention, a method for measuring ink drops, which measures ink drops sprayed and dropped from an inkjet head of an inkjet device, includes: a step s100 of supplying an ink drop measurement pad in which a plurality of groove portions are formed with an interval corresponding to a nozzle pitch of an inkjet device and have uniform cross-sections throughout an entire longitudinal direction and supporting the ink drop measurement pad by a plate; a step s200 of arranging the ink drop measurement pad supported in the step s100 below the inkjet head while aligning the groove portion to be positioned perpendicularly below a nozzle; a step s300 of spraying ink drops from the nozzle toward the pad arranged in the step s200 and dropping the ink drops into the groove portions; and a step s400 of measuring a deviation of a length and a central position of each ink drop dropped in the step s300 by using an ink drop measurement device.

In the method for measuring ink drops of the present invention, in the step s400, the length of the ink drop dropped onto the pad p may be measured by the ink drop measurement device to measure a volume of the ink drop.

In the method for measuring ink drops of the present invention, in the step s400, a central position c1 of the ink drop dropped onto the pad p may be measured by the ink drop measurement device, the measured central position c1 may be compared with a reference central position c of each ink drop determined by an alignment mark formed on a corner of the pad, and a position deviation e (Δx, Δy) therebetween may be measured.

In the method for measuring ink drops of the present invention, in the step s400, by measuring the ink drop dropped onto the pad p, existence of the ink drop may be measured to determine whether the ink drop is ejected from all nozzles of the initial inkjet head after installing the inkjet printer, thereby analyzing an insufficient air removal state or a nozzle clogging state of each nozzle.

In the method for measuring ink drops of the present invention, in the step s400, when a specific voltage waveform is applied to a specific nozzle to eject a plurality of drops, the volume of the ink drop dropped onto the pad p may be measured to calculate the volume ejected from the specific nozzle, and one or a plurality of voltage waveforms may be set in one nozzle for achieving a target volume of the ink drop by ejecting a plurality of ink drops at the same position of the pad p by using the calculated result.

In the method for measuring ink drops of the present invention, in the step (s400), when a specific voltage waveform is applied to a plurality of nozzles to eject a plurality of drops, a volume ejected from each nozzle may be calculated by measuring the volume of the ink drop dropped onto the pad p, and a combination of a plurality of nozzles may be set to achieve a target volume of the ink drop by ejecting a plurality of ink drops at the same position of the pad p using the calculation result.

In the method for measuring ink drops of the present invention, in the step s400, when an inkjet device having a plurality of heads ejects ink drops, the volume and position of the ink drop dropped onto the pad p reflecting an effect of crosstalk between the nozzles of the inkjet head may be measured, and the position and volume of each nozzle may be compensated to avoid the crosstalk between the nozzles by using the measured result.

In the method for measuring ink drops of the present invention, a step (s500) of removing the ink drop dropped onto the pad may be performed after the step (s400) is finished.

In an embodiment of the present invention, an imprint device including the ink drop measurement pad includes: an imprint device unit; and a head maintenance unit installed in parallel to the imprint device unit, the imprint device unit includes: an X3 stage on which a work holder wh on which an object b2 to be imprinted such as a substrate is disposed is movable in an X-axis direction; a Y3 stage allowing the X3 stage to be movable in a Y-axis direction; a X4 stage extending so that the inkjet head h is installed higher than a height of the object b2 to be imprinted and movable until a Y2 stage of the head maintenance unit in the X-axis direction; a mold driving unit configured to hold and support a mold m that performs imprinting, correct a shape of the mold with the object to be imprinted, and perform a stamping operation; an optical device configured to align a mark of the object b2 to be imprinted with a mark of the mold m; and a curing device configured to cure ink drops sprayed after molding the object to be imprinted, and the head maintenance unit includes: a Y2 stage installed in parallel to the Y1 stage and movable in the Y-direction; a plate device installed on the Y2 stage to fix the ink drop measurement pad p; and an ink drop measurement device installed on the head maintenance unit to measure a length and a position of each ink drop dropped onto the pad.

In the imprint device including the ink drop measurement pad of the present invention, an X2 stage may be additionally installed on the head maintenance unit to be moved in the X-direction, and an ink removal device configured to remove the ink drop dropped onto the pad may be installed on the X2 stage.

In the imprint device including the ink drop measurement pad of the present invention, a roll supply device configured to continuously supply the ink drop measurement pad in a roll manner to the plate device may be additionally installed on the head maintenance unit.

In the imprint device including the ink drop measurement pad of the present invention, the ink removal device may include a vacuum suction device configured to suction the ink drops.

In the imprint device including the ink drop measurement pad of the present invention, the ink removal device may include an UV irradiation device configured to cure the ink drops.

The present invention has the advantage that the volumes and positions of ink drops may be accurately measured using the pad to a precision of 1% or less much more simply and quickly in the inkjet printer device than the existing techniques that use a strobe.

Thus, as the ink drop dropped onto the pad p is measured by using the above-described feature, whether the ink drop exists may be measured to determine whether ink drops are ejected from all nozzles of the initial inkjet head after the inkjet printer is installed, and the insufficient air removal state or the nozzle clogging state of each nozzle may be identified to implement additional action to solve the nozzle clogging or appropriately compensate for the nozzle clogging.

Also, when the specific voltage waveform is applied to the specific nozzle to eject the plurality of ink drops, the volume ejected from the specific nozzle may be calculated by measuring the volume of the ink drops dropped onto the pad p.

By using this, the setting of one or the plurality of voltage waveforms in one nozzle for achieving the target volumes of the ink drops by ejecting the plurality of ink drops at the same position of the pad p may quickly and easily performed.

When the specific voltage waveform is applied to the specific nozzle to eject the plurality of ink drops, the volume ejected from the specific nozzle may be calculated by measuring the volume of the ink drops dropped onto the pad p.

By using this, setting of the combination of the plurality of nozzles for achieving the target volumes of the ink drops by ejecting the plurality of ink drops at the same position of the pad p may be quickly and easily performed.

Particularly, the inkjet printer device may perform the operation of ejecting the predetermined ink drops from the predetermined nozzles according to the pattern information required for each nozzle. Here, the sound waves generated when each nozzle ejects cause the crosstalk by which the ejection speed of the ink drops of the surrounding nozzles is reduced and the volume thereof is also reduced when the nozzle ejects the ink drops.

Even in this case, the nozzle may be easily compensated to prevent the crosstalk by measuring the volume and position of the ink drop dropped onto the pad p.

Also, the present invention may quickly and easily measure the position error of the ink drops dropped from each nozzle simultaneously with the volume of the ink drops by measuring the positions of the ink drops dropped onto the pad p in the X and Y directions.

This position error measurement result may be compensated during substantial printing to enable more precise printing.

DETAILED DESCRIPTION

Hereinafter, an embodiment according to the present invention will be described with reference to the accompanying drawings.

Figure 1:
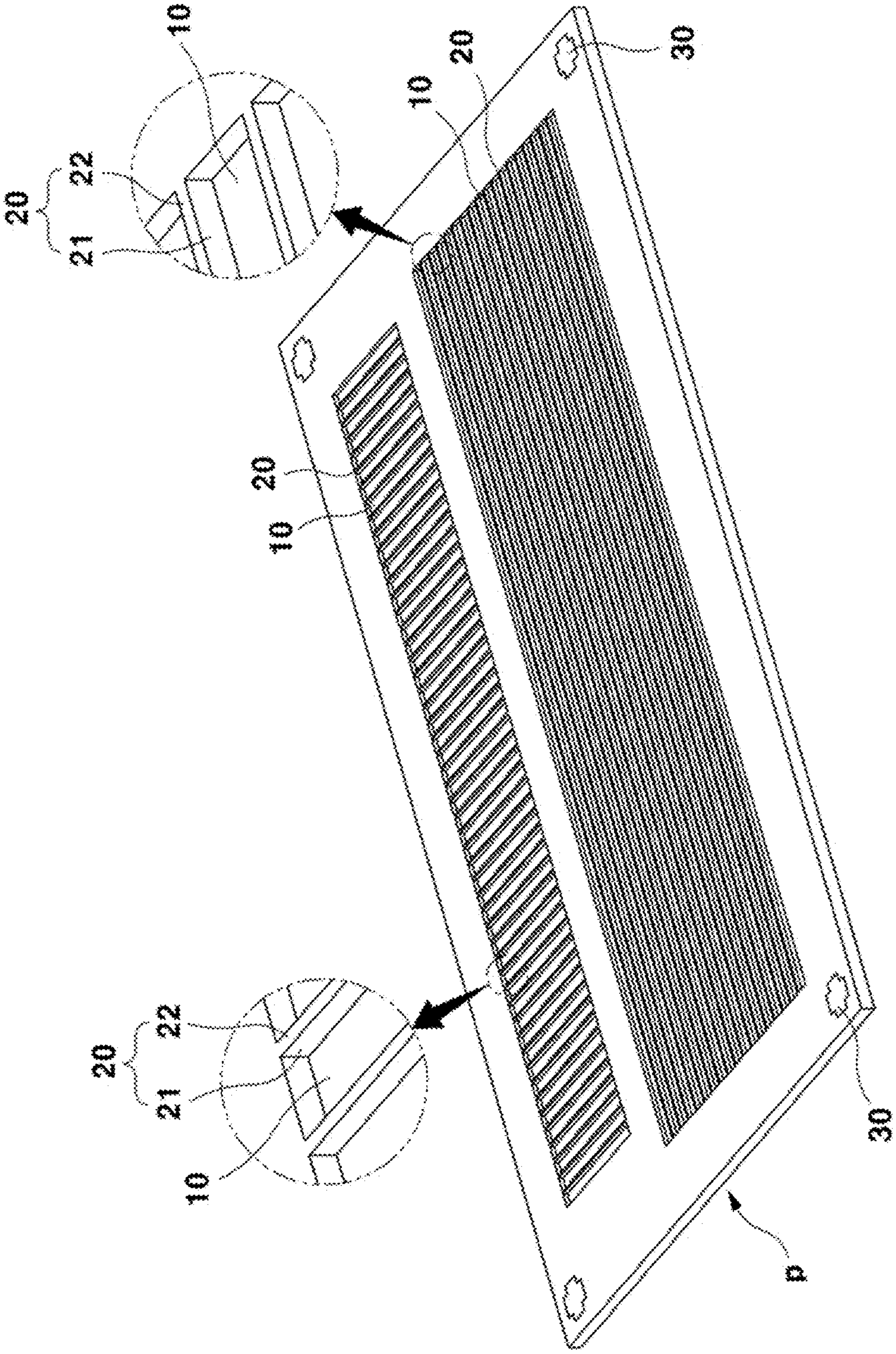
FIG. 1 is a view illustrating an ink drop measurement pad according to the present invention.

FIG. 1 is a view illustrating an ink drop measurement pad according to the present invention.

Hereinafter, the ink drop measurement pad will be described.

In the present invention, a pad (p) for measuring ink drops may be formed in a flat sheet or film shape by a photolithography or imprint method.

The pad p for measuring ink drops includes a plurality of groove portions 10, a plurality of wall portions 20 formed between the groove portions 10, and an alignment mark 30.

The wall portion 20 includes a side wall portion 21 formed on both sides of the groove portion 10 to protrude upward and an upper wall portion 22 formed on a top surface between the side wall portions 21.

The alignment mark 30 is formed at each corner of the pad p along a head printing width.

An interval of the plurality of groove portions 10 is equal to a pitch interval of a nozzle or a multiple or divisor.

That is, when a head of 600 npi (Nozzle Per Inch) is used, the interval of the groove portions may be a multiple of 600 npi such as 1200 npi, 1800 npi, and 2400 npi or a divisor of 600 npi such as 300 npi, 200 npi, and 100 npi.

The groove portion 10 may have a length enough to encompass all of the nozzles in arrangement in a transverse direction of a head in an inkjet device.

The groove portion 10 may have a depth and a width that maintain the same size throughout a longitudinal direction of the groove portion 10.

Although the groove portion 10 has a rectangular cross-sectional shape in this embodiment, the present invention is not limited thereto. For example, the groove portion 10 may have various shapes such as an inverted triangle or semi-circular shape as long as the shape maintains the same cross section throughout the longitudinal direction.

The width and depth of the groove portion 10 may be determined to realize: an ink property related to ink spreading control characteristics such as viscosity, surface tension, drying characteristics, and polarity of ink to be used; and sufficient ink drop spreading required for measurement precision depending on a surface condition such as surface tension and roughness of a groove and a bottom surface of the groove.

Figure 5:
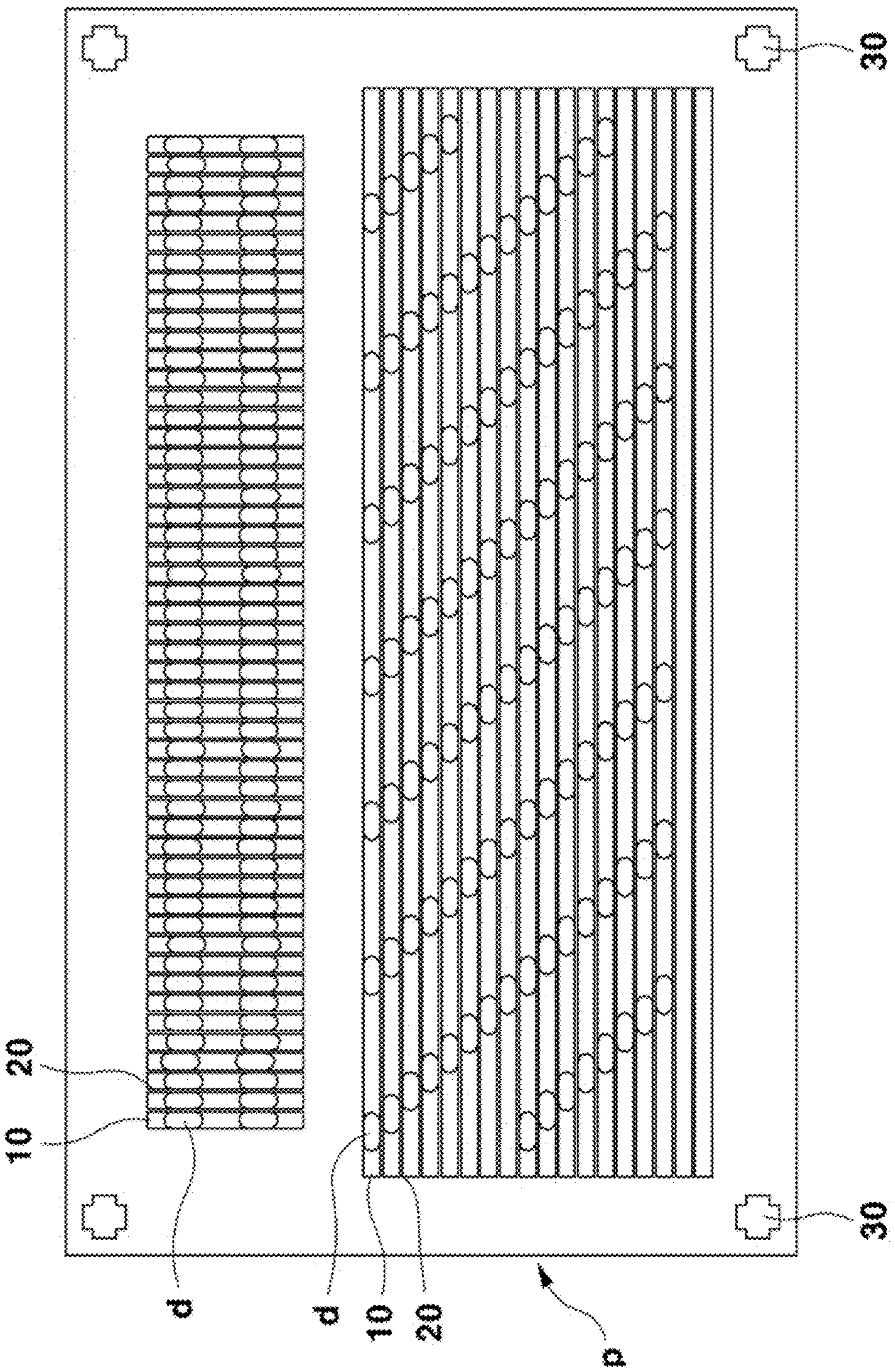
FIG. 5 is a view illustrating a state ink is dropped onto the entire ink drop measurement pad according to the present invention.

As illustrated in FIG. 5, all of the groove portions 10 formed in the same direction as a printing direction and two groove portions 10 formed in a direction perpendicular to the printing direction are formed in the pad p.

When the groove portions 10 in the printing direction and the direction perpendicular to the printing direction are formed together in one sheet of pad p, ink drop dropped position errors in the printing direction and the direction perpendicular to the printing direction of each nozzle may be measured simultaneously.

Figure 7:
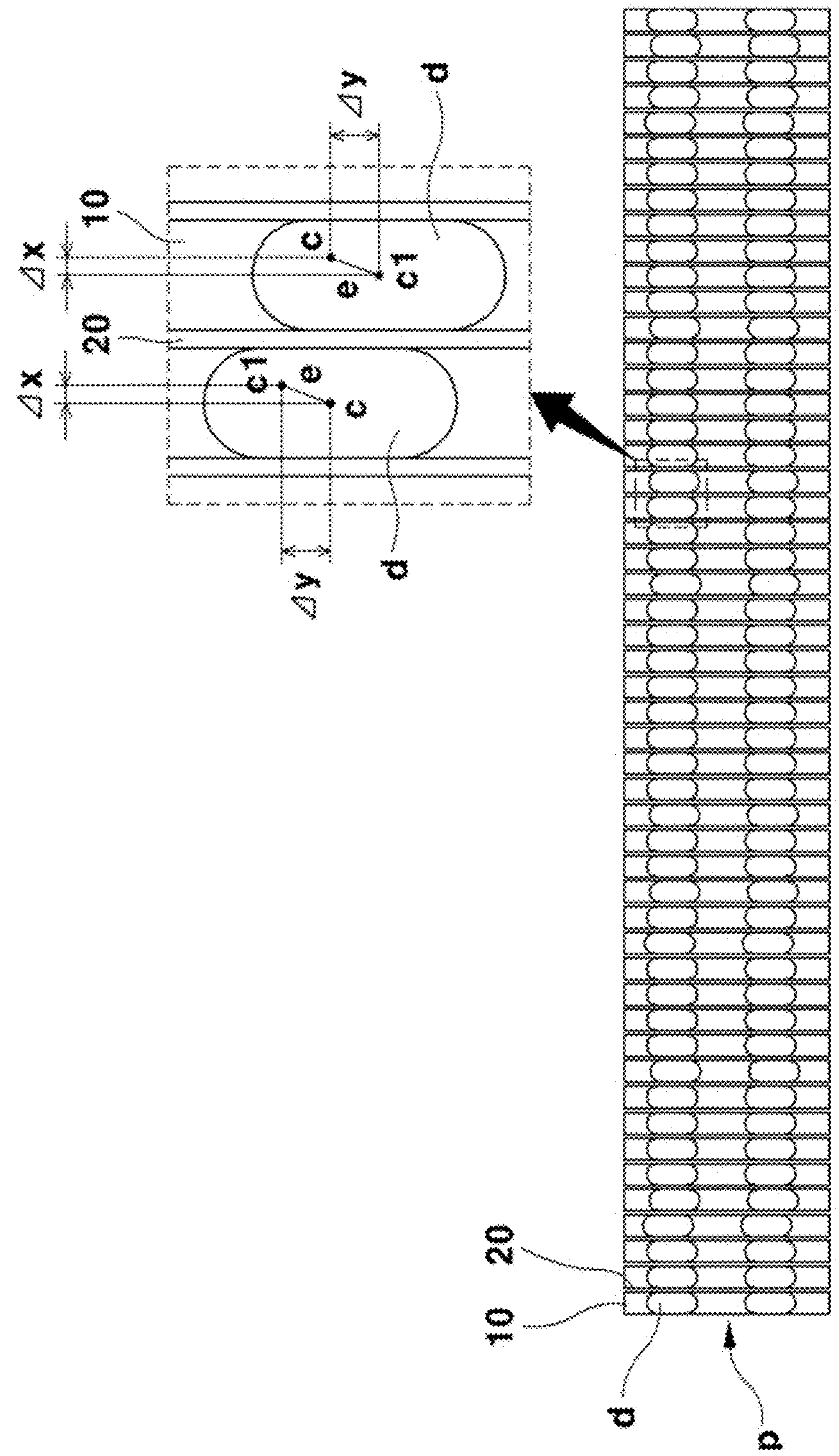
FIG. 7 is a view illustrating a state in which ink is dropped when the ink drop measurement pad is installed in the same direction as a printing direction according to the present invention.
Figure 8:
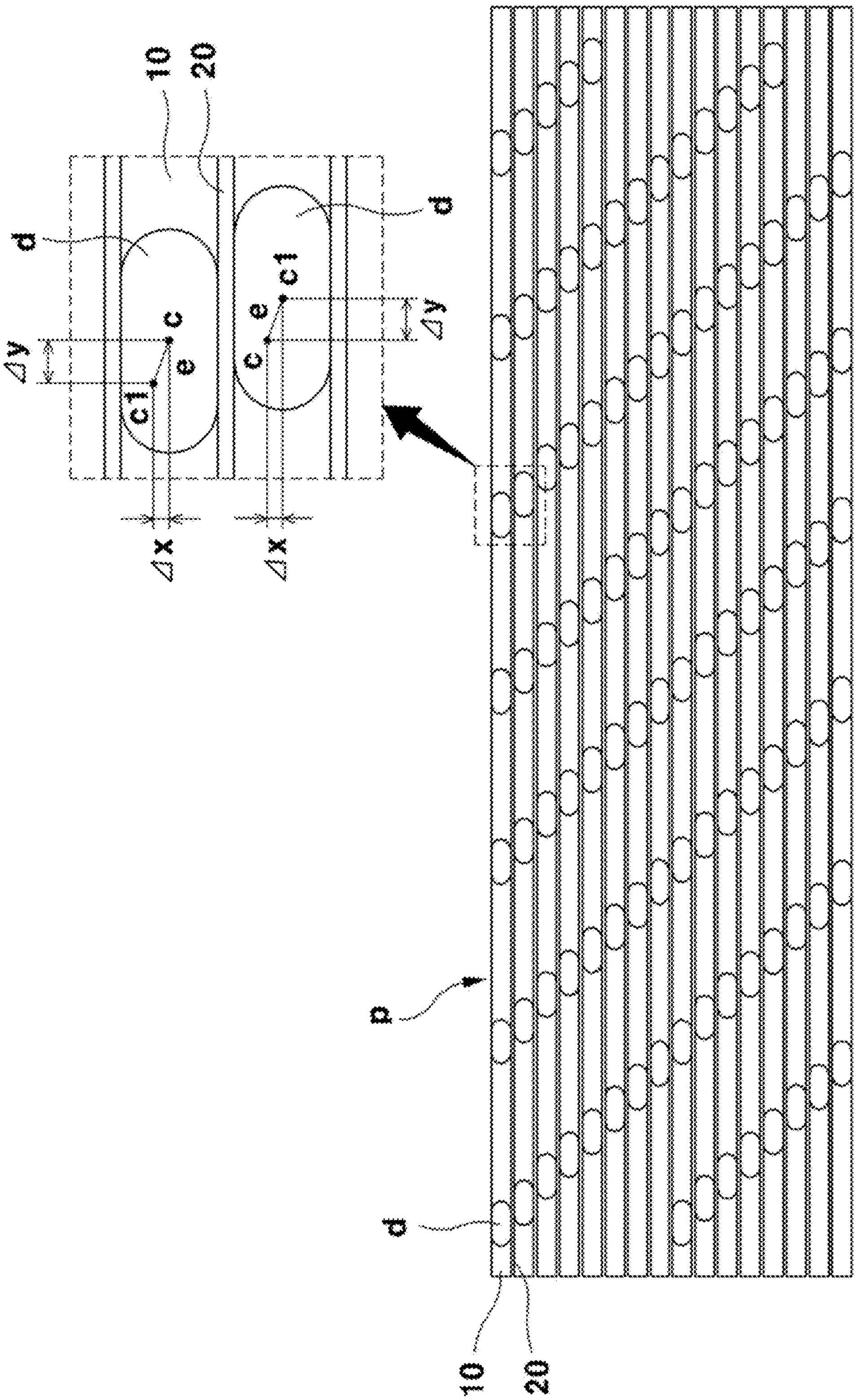
FIG. 8 is a view illustrating a state in which ink is dropped when the ink drop measurement pad is installed in a direction perpendicular to the printing direction according to the present invention.

Alternatively, depending on a purpose of measurement, the groove portion 10 may be formed in the pad p in the printing direction as illustrated in FIG. 7 or in the direction perpendicular to the printing direction as illustrated in FIG. 8.

As the groove portions 10 in the printing direction and the direction perpendicular to the printing direction are formed together in one sheet of pad p, the ink drop dropped position errors in the printing direction and the direction perpendicular to the printing direction of each nozzle may be measured simultaneously.

Also, the entire pad p may be made of one material, or the groove portion 10 may be made of a lyophilic material so that ink drops are well accommodated and the wall portion 20 may be made of a lyophobic material.

Alternatively, the pad p may be made of or coated with a lyophilic material while the side wall portion 21 of the groove portion 10 is made of a lyophobic material, or the pad p may be coated with a lyophilic material while the upper wall portion 22 is made of or coated with a lyophobic material to have a lyophobic property.

The entire pad p may be made of a transparent material so that the pad p is illuminated from therebelow.

Alternatively, in the pad p, the groove portion 10 and the wall portion 20 may have different colors so that the groove portion 10 and the wall portion 20 are easily distinguished from each other.

Alternatively, in the pad p, the groove portion 10 may be made of a transparent material, and the wall portion 20 may have a color so that the groove portion 10 and the wall portion 20 are easily distinguished from each other.

The pad p may have a flat sheet shape so as to be mounted on a flat plate device of the inkjet device.

Alternatively, the pad p may have a roll shape having a width corresponding to that of the inkjet head so that the pad p is easily supplied to and removed from the inkjet device and continuously supplied.

The pad p may be supplied to the inkjet device in a form of a rectangular sheet or continuously supplied in a form of a roll having a width corresponding to a head width.

Figure 2:
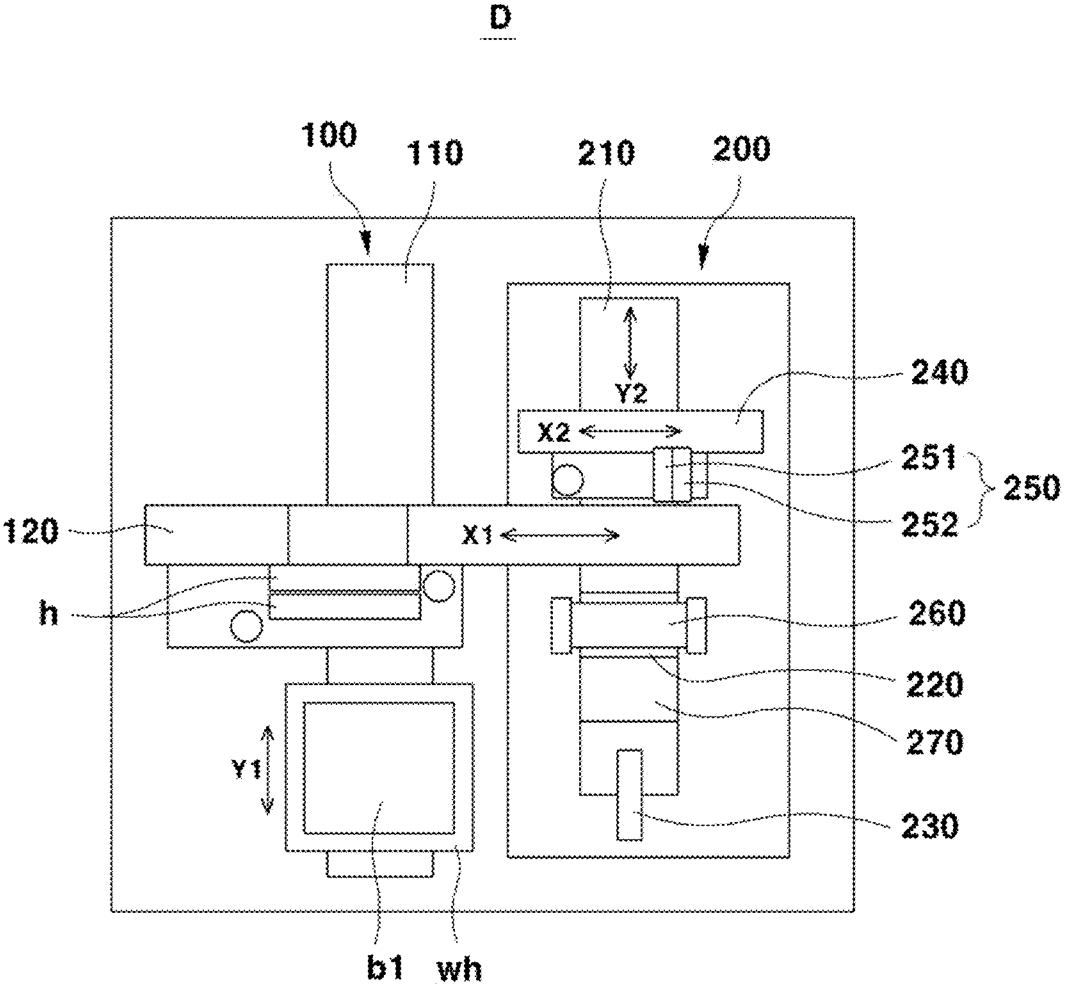
FIG. 2 is a view illustrating an inkjet printer device including the ink-drop measurement pad according to the present invention.

FIG. 2 is a view illustrating an inkjet printer device including an ink drop measurement pad according to the present invention.

Next, the inkjet printer device including the above-described pad will be described.

An inkjet printer device D includes an inkjet printer unit 100 and a head maintenance unit 200 installed in parallel to the inkjet printer unit 100.

The inkjet printer unit 100 includes a Y1 stage 110 including a work holder wh on which an object b1 to be printed such as a substrate is disposed and movable in a Y-direction and a X1 stage 120 extending so that an inkjet head h is installed higher than a height of an object b1 to be printed and the X1 stage 120 is moved until a Y2 stage 210 of the head maintenance unit 200 in an X-direction.

Figure 3:
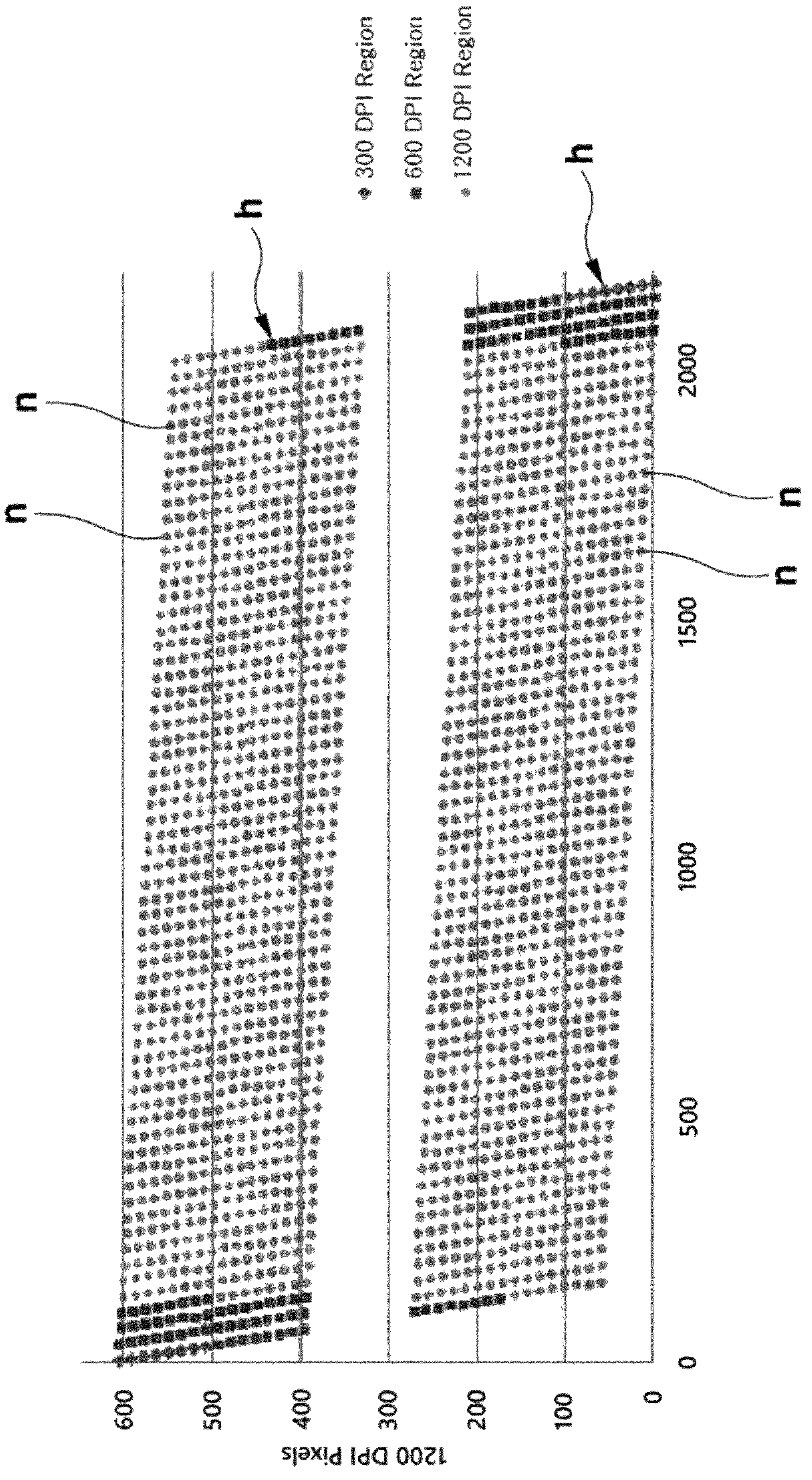
FIG. 3 is a view illustrating a state in which nozzles are arranged in the inkjet printer device including the ink drop measurement pad according to the present invention.

FIG. 3 is a view illustrating a state in which nozzles are arranged in the inkjet printer device including the ink drop measurement pad according to the present invention.

A plurality of nozzles n are installed on a bottom surface of the head h and inclined in the transverse direction of the head h. Alternatively, arrangement of the nozzles n may be different for each head h instead of being inclined.

A reason for the inclined arrangement is to insert the nozzles n maximally within a size of the same head h and simultaneously to narrow an interval between the nozzles n, thereby increasing a resolution and connecting the head h continuously on a linear line in the transverse direction.

Alternatively, depending on a design of the head, the heads h may be arranged in two rows and continuously connected so that the nozzles n are continuously connected at a predetermined pitch in the transverse direction.

The head maintenance unit 200 includes an Y2 stage 210 installed in parallel to the Y1 stage 110 and movable in the Y direction, a plate device 220 installed on the Y2 stage 210 to arrange the ink drop measurement pad p, and an ink drop measurement device 230.

The plate device 220 has a flat plate shape, and the measurement pad p is fixed to an upper portion of the plate device 220. The plate device 220 may be rotatable to align a direction of the groove portion 10 to the printing direction even when the measurement pad p having the groove portion 10 in the printing direction and in the direction perpendicular to the printing direction is fixed to the plate device 220.

As the plate device 220 is rotatable by a well-known rotation device as necessary, the pad p may be arranged in the printing direction or in the direction perpendicular to the printing direction.

A roll supply device 260 may be provided for a case of supplying the pad p in a roll manner.

When the pad (p) is supplied to the roll supply device 260, tensile force may act in a roll supply direction to stretch the measurement pad p in the roll supply direction, and this limitation may be compensated in real time by measuring a substantial width of each groove portion 10.

The ink drop measurement device 230 that serves to measure a length and a degree of deviation from a center position of the ink drop dropped in the groove portion 10 of the pad p has a well-known configuration.

The ink drop measurement device 230 may include any device that is capable of measuring a shape of an ink drop, such as a vision system using a camera, a laser scan device, or an ultrasonic device.

On the other hand, the head maintenance unit 200 includes an X2 stage 240 that is additionally installed to be movable in the X-direction, and an ink removal device 250 capable of removing ink drops dropped onto the pad p is installed on the X2 stage 240.

As the ink removal device 250, a vacuum suction device 251 capable of suctioning ink drops and/or an UV irradiation device 252 capable of curing ink drops to attach and remove the ink drop to and from the pad p are installed.

A maintenance device 270 for maintaining the inkjet head is installed on the head maintenance unit 200.

In the inkjet printer device D according to the present invention, the inkjet printer unit 100 performs a basic inkjet printing operation in a well-known manner.

That is, the object b1 to be printed is moved along the Y1 stage 110 and disposed below the inkjet head h, and then ink drops are sprayed to the nozzle of the inkjet head h to perform the printing operation.

An operation of measuring ink drops by using the ink drop measurement pad according to the present invention is performed by the head maintenance unit 200.

Thus, the inkjet head h is transferred from the inkjet printer unit 100 to the head maintenance unit 200 along the X1 stage 120, and then the operation of measuring ink drops is performed by an ink drop measurement method described later.

Figure 4:
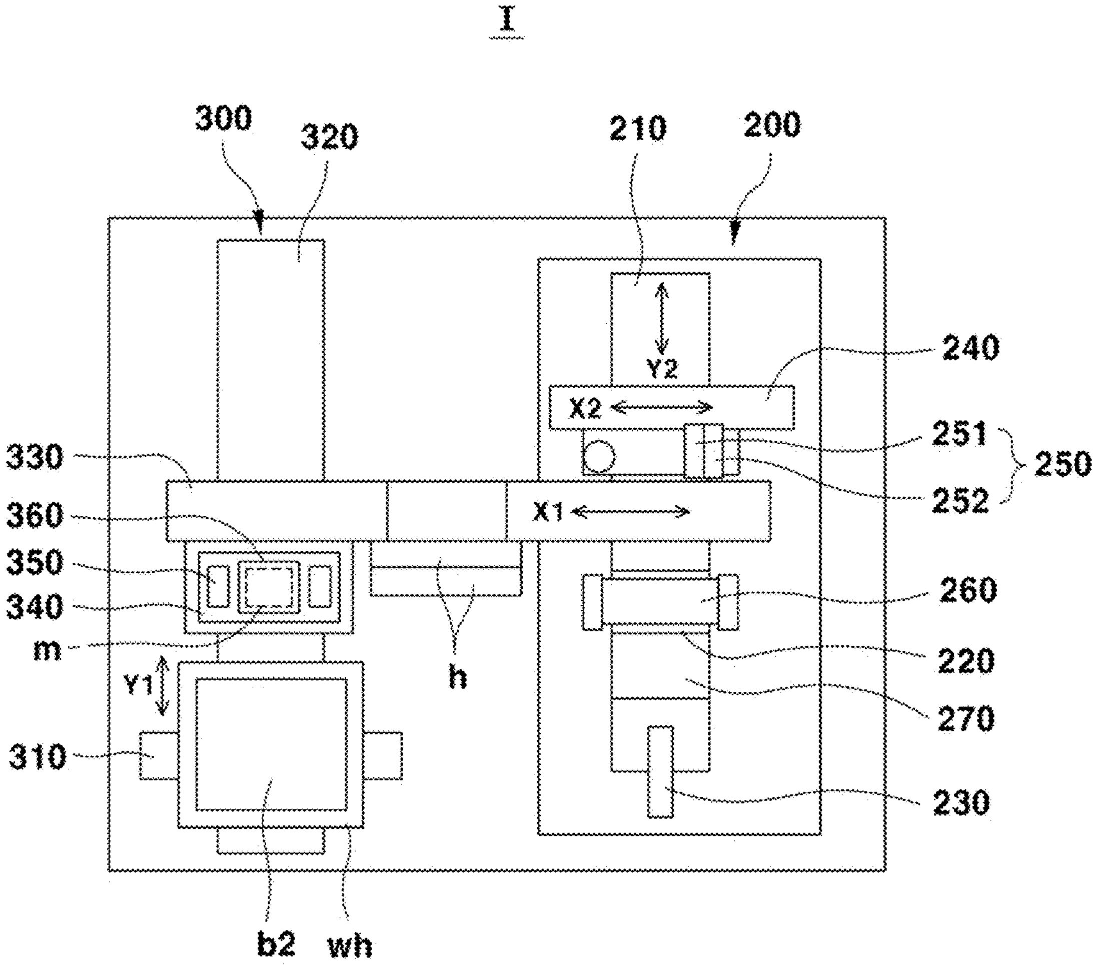
FIG. 4 is a view illustrating an imprint device including an ink-drop measurement pad according to the present invention.

FIG. 4 is a view illustrating an imprint device including the inkjet printer unit having the ink drop measurement pad according to the present invention.

An imprint device I including the inkjet printer unit having the ink drop measurement pad according to the present invention includes an imprint device unit 300 and a head maintenance unit 200 installed in parallel to the imprint device unit 300.

The imprint device unit 300 includes: an X3 stage 310 on which a work holder wh on which an object b2 to be imprinted such as a substrate is disposed is movable in the X-axis direction; a Y3 stage 320 allowing the X3 stage 310 to be movable in the Y-axis direction; a X4 stage 330 extending so that the inkjet head h is installed higher than a height of the object b2 to be imprinted and movable until the Y2 stage 210 of the head maintenance unit 200 in the X-axis direction; a mold driving unit 340 that holds and supports a mold m for performing imprinting, corrects a shape of the mold with the object to be imprinted, and performs a stamping operation; an optical device 350 for aligning a mark of the object b2 to be imprinted with a mark of the mold m; and a curing device 360 for curing an imprint material after molding the object to be imprinted.

On the other hand, since the head maintenance unit 200 in the imprint device I has the same configuration as the above-described head maintenance unit 200 of the inkjet device D, the Y2 stage 210 is installed in parallel to the Y3 stage 310, and the rest of the configuration is the same.

In the imprint device I according to the present invention, a basic imprint operation is performed by the imprint device unit 300 in a well-known manner.

That is, the object b2 to be imprinted is disposed below the inkjet head h through the X3 stage 310 and the Y3 stage 320, and then ink drops made of the imprint material are sprayed from the inkjet head h.

Thereafter, the object b2 to be imprinted onto which the ink drop is sprayed is transferred below the mold driving unit 340, and the mark of the object b2 to be imprinted is aligned with the mark of the mold m through the optical device 350.

Finally, the mold m is transferred downward by the mold driving unit 340 to perform the imprint operation, and an operation of curing the molded imprint material through the curing device 360 is performed.

An operation of measuring ink drops by using the ink drop measurement pad according to the present invention is performed by the head maintenance unit 200.

Thus, the inkjet head h is transferred from the imprint device unit 300 to the head maintenance unit 200 along the X4 stage 330, and then the operation of measuring ink drops is performed by an ink drop measurement method described later.

As described above, the ink drop measurement methods according to the present invention have a common aspect in that the inkjet head h is transferred to the head maintenance unit 200, and the measurement is performed in all of the inkjet printer device D and the imprint device I.

Hereinafter, a method for measuring ink drops by using the inkjet printer device D or the imprint device I having the above-described configuration will be described.

First, a step s100 of aligning an ink drop measurement pad p in a printing direction, the ink drop measurement pad p manufactured to form a plurality of groove portions 10 with an interval corresponding to a nozzle pitch of an inkjet device and have two pattern parts in which the groove portions 10 have uniform cross-sections throughout an entire printing direction and a direction perpendicular to the printing direction is performed.

Thereafter, a step S200 of arranging the ink drop measurement pad formed in the step s100 below an inkjet head is performed.

An inkjet head h is moved to a head maintenance unit 200 by driving an X1 stage 120, and a plate device 220 on which a pad p is installed is moved directly below the inkjet head h by driving an Y2 stage 210.

Figure 6:
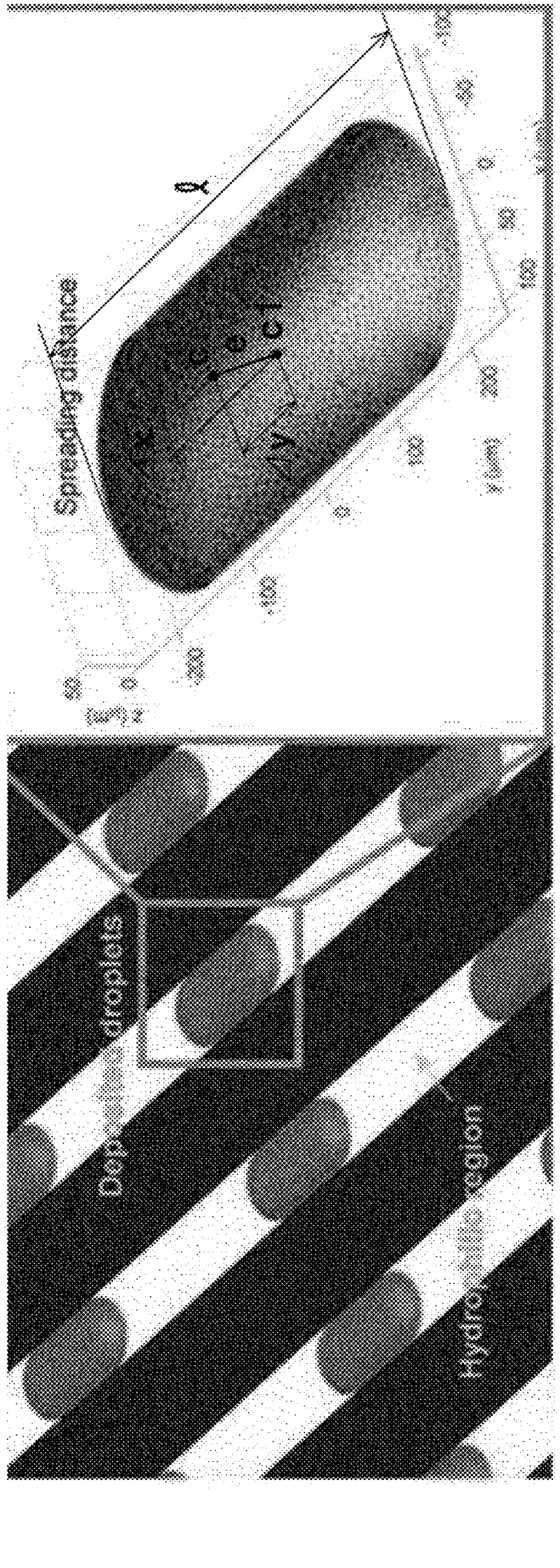
FIG. 6 is a view illustrating a measurement state of ink dropped onto the ink drop measurement pad according to the present invention.

FIG. 5 is a view illustrating a state in which ink is dropped onto the entire ink drop measurement pad according to the present invention. FIG. 6 is a view illustrating a measurement state of the ink dropped onto the ink drop measurement pad according to the present invention.

In a step s300, when an operation of spraying ink drops from the inkjet head toward the pad p and dropping the ink drops in the groove portions of the pad p is performed, the ink drops are dropped onto the pad p as illustrated in FIG. 5.

When the groove portions 10 in the pad p are arranged in a Y direction that is the same direction as the printing direction, the ink drops are dropped in a form illustrated in FIG. 7.

When the groove portions 10 in the pad p are arranged in an X-direction that is perpendicular to the printing direction, the ink drops are dropped in a form illustrated in FIG. 8.

Since an ejection degree of the ink drop has an error depending on manufacturing and assembly tolerances in the ink head h and the ejection conditions, an error at a central position of the ink drop with Δx and Δy in the X-direction and the Y-direction occurs as many as an ejection error occurring at the groove portion 10 of the pad p.

In a step s400, a step s410 of driving the Y2 stage 210 to transfer the pad p onto which the ink drops are dropped below an ink drop measurement device 230 is firstly performed.

Thereafter, a step s420 of measuring a volume and position precision of each ink drop is performed by measuring a position (x, y) and a length 1 of each ink drop dropped in the step s300 as illustrated in FIG. 6.

When a length 1 and a position c1 $(x, y)$ of each ink drop d in the groove portion 10 are measured by using a vision inspection device as the ink drop measuring device 230, a volume of the ink drop is automatically calculated because a width and a depth of the groove portion 10 are already known.

Also, a position deviation e(Δx, Δy) between a center (c) of each ink drop determined by the alignment mark 30 formed on the pad p and a position c1$(x,y)$ of a substantially dropped ink drop is automatically calculated by the vision inspection device.

An ink drop spread as long as possible in the groove 10 is more advantageous for measuring a length of the ink drop with higher precision.

However, when a small ink drop is spread at least 300 um to 400 um in the longitudinal direction of the groove portion by various variables considered in determining a size of the groove portion 10, i.e., by a shape of the groove portion 10, an interval and a depth of the pattern, and each surface state of the groove portion 10, a required measurement accuracy may be satisfied.

Also, when the central position c1 of the spread length of each ink drop d dropped onto the pad p is found and compared with the reference central position c determined by the alignment mark 30 of the pad p to determine whether the deviation e therebetween occurs and compensate the deviation e in the inkjet device for correction of the deviation, the position deviation may be minimized to perform precise printing.

In a step s500, the pad p is moved below an ink removal device 250 installed on the X2 stage 240 by driving the Y2 stage 210 after measurement of all ink drops is finished.

Thereafter, the ink removal device 250 including a vacuum suction device 251 capable of suctioning ink drops or a UV irradiation device 252 capable of curing ink drops according to the type of ink performs an operation of removing the ink of the pad p while moving along the X2 stage 240.

When a setting operation of the inkjet printer device is further necessary, the steps s100 to s500 are repeated.

The above-described features are all applied in the same manner even in the imprint device including the inkjet printer unit having the ink drop measurement pad, except that the ejected material may be changed to a functional material depending on products to which the object to be imprinted is applied.

The present invention has an advantage that the volumes and positions of ink drops of each nozzle may be accurately measured to a precision of 0.5% or less simply and quickly.

Due to this, when the inkjet printer device is formed to compensate each nozzle n, more uniform ink drops may be printed due to different voltage waveforms or voltage waveform change compensation for each nozzle to improve uniformity of a printed result.

Also, when a position precision of the ink drops of each nozzle n is checked and compensated, an error of the position precision may be minimized.

Due to this, when precise printing is required, the present invention has an advantage of improving the position precision by performing printing that compensates for the above-described dropping error of each nozzle.

The pad according to the present invention may be used in various cases as follows.

(1) Whether the ink drop exists may be measured to determine whether ink drops each having a sufficient size are ejected from all nozzles of the initial inkjet head after the inkjet printer is installed, and an insufficient air removal state or a nozzle clogging state of each nozzle may be identified and appropriately compensated by measuring the ink drop dropped onto the pad p.

(2) When a specific voltage waveform is applied to a specific nozzle to eject a plurality of ink drops, a volume ejected from the specific nozzle may be calculated by measuring the volume of ink drops dropped onto the pad p.

By using this, one or a plurality of voltage waveforms in one nozzle for achieving target volumes of ink drops by ejecting a plurality of ink drops at the same position of the pad p may be set, and a desired voltage waveform may be selected and used.

(3) When a specific voltage waveform is applied to a plurality of nozzles and a plurality of ink drops are mixed and ejected to one position (e.g., one pixel), an ejected volume of each nozzle may be calculated by measuring a combined volume of the plurality of ink drops dropped onto the pad (p).

By using this, a combination of a plurality of nozzles for achieving target volumes of ink drops by ejecting a plurality of ink drops at the same position of the pad p may be set, and/or a voltage waveform of each nozzle may be selected.

(4) Typically, the inkjet head continuously form four or seven different plurality of voltage waveforms to all nozzles and select one or a plurality of voltage waveforms among the different plurality of voltage waveforms to control the ink drops having sizes corresponding thereto to be ejected.

The inkjet printer device may perform an operation of ejecting the predetermined ink drops from the predetermined nozzles according to pattern information required for each nozzle. Here, sound waves generated when each nozzle ejects affect a surrounding of the nozzle when the nozzle ejects.

This causes a problem in that crosstalk by which an ejection speed of the ink drops is reduced and a volume thereof is also reduced occurs in surrounding nozzles to degrade a printing quality.

Even in this case, effects of the crosstalk may be checked by analyzing the volume and position of the ink drops dropped through the ink drop measurement pad of the present invention, and the voltage waveform applied to the nozzle may be compensated to prevent the crosstalk.

(5) Since the position error of the ink drop dropped onto the pad p are measured, when performing RGB pixel printing of a high-resolution display, i.e., when accurate printing of ink drops is required, the error is identified in each nozzle of the inkjet head and appropriately compensated.

Thus, the present invention may be applied even to the field of display technology and micro-wire printing.

When printing uniformity of the ink drops is 1% or more, the printing technology may be applied to the field of visible display applications, especially the field requiring RGB pixel printing.

These application fields include RGB Color Resist ink printing for manufacturing a color filter, OLED display manufacturing that prints all layers such as HIL, HTL and EML by inkjet printing, quantum dot color conversion (QDCC) ink printing for QD OLED display, perovskite color conversion ink printing, OLED display manufacturing by merging blue deposition with red and green ink inkjet technology, polymer OLED manufacturing that manufactures all of HIL, IL, and RGB EML by using inkjet ink, QD ink printing for blue or UV μLED or MiniLED color conversion, blue, red, and green ink printing of self-luminous QD displays, self-luminous perovskite, and blue, red, and green ink printing.

Also, in the field of micro-wire printing, when printing wires with a line width of 20 um or less in an inkjet method or printing etch resist or electroplating resist patterns to make wires with a line width of 20 um or less, uniformity of the line width is important as the line width gradually decreases. In particular, the uniformity of the line width is required to be more uniformly maintained in a substrate for 5G communication (particularly, in 5G communication, since loss occurs intensively at a line edge, the uniformity of the line width in this aspect is important to reduce loss caused by straightness at the line edge).

Also, in the field of ultra-fine wire printing, when accurate ink drop volume control of 1% or less and a position precision of several μm or less are required to print a wire with a line width of 10 μm or less in a hybrid method using an inkjet coating method and an imprint method, the technology of the present invention may be applied.

The present invention has an advantage of being applied to the above-described fields and being used for measuring the size and position of the ink drop to secure the uniformity of 1% or less.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for measuring ink drops, which measures ink drops sprayed and dropped from an inkjet head of an inkjet device, the method comprising:

supplying an ink drop measurement pad in which a plurality of groove portions are formed with an interval corresponding to a nozzle pitch of an inkjet device and have uniform cross-sections throughout an entire longitudinal direction and supporting the ink drop measurement pad by a plate;

arranging the ink drop measurement pad below the inkjet head while aligning the groove portions to be positioned perpendicularly below a nozzle;

spraying ink drops from the nozzle toward the ink drop measurement pad and dropping the ink drops into the groove portions; and measuring a deviation of a length and a central position of each ink drop dropped into the groove portions by using an ink drop measurement device, wherein, in the measuring, when a specific voltage waveform is applied to a specific nozzle to eject a plurality of drops, a volume of the ink drop dropped onto the ink drop measurement pad is measured to calculate a volume ejected from the specific nozzle, and one or a plurality of voltage waveforms are set in one nozzle for achieving a target volume of the ink drop by ejecting a plurality of ink drops at the same position of the ink drop measurement pad by using the calculated result.

2. The method of claim 1, wherein in the measuring, when a specific voltage waveform is applied to a plurality of nozzles to eject a plurality of drops, a volume ejected from each nozzle is calculated by measuring the volume of the ink drop dropped onto the ink drop measurement pad, and a combination of a plurality of nozzles is set to achieve a target volume of the ink drop by ejecting a plurality of ink drops at the same position of the ink drop measurement pad using the calculation result.

3. The method of claim 1, wherein in the measuring, when an inkjet device having a plurality of heads ejects ink drops, the volume and position of the ink drop dropped onto the ink drop measurement pad reflecting an effect of crosstalk between the nozzles of the inkjet head are measured, and the position and volume of each nozzle are compensated to avoid the crosstalk between the nozzles by using the measured result.

4. The method of claim 1, further comprising removing the ink drop dropped onto the ink drop measurement pad after the measuring.

* * * * *